United States Patent [19]
Kishimoto

[11] Patent Number: 6,084,416
[45] Date of Patent: Jul. 4, 2000

[54] APPARATUS FOR DETECTING A ROTATIONAL ANGLE BASED ON PULSE PROPAGATION

[75] Inventor: Hiroshi Kishimoto, Yokohama, Japan

[73] Assignee: Nikon Corporation, Tokyo, Japan

[21] Appl. No.: 08/998,278

[22] Filed: Dec. 24, 1997

[30] Foreign Application Priority Data

Dec. 26, 1996 [JP] Japan ................................. 8-348631

[51] Int. Cl.[7] .......................... G01R 27/04; G01B 7/30
[52] U.S. Cl. ................ 324/644; 324/207.13; 324/207.25
[58] Field of Search ..................... 324/207.13, 207.17, 324/207.22, 207.25, 160, 166, 533, 644, 645; 341/15; 336/73, 75, 77, 79, 135

[56] References Cited

U.S. PATENT DOCUMENTS

| | | | |
|---|---|---|---|
| 3,618,075 | 11/1971 | Kaida | ........................................ 341/15 |
| 4,375,057 | 2/1983 | Weise et al. | ........................ 324/644 X |
| 5,457,990 | 10/1995 | Oswald et al. | ...................... 324/644 X |
| 5,609,059 | 3/1997 | McEwan | ................................... 73/290 |
| 5,621,318 | 4/1997 | Jacobsen et al. | ..................... 341/15 X |

*Primary Examiner*—Gerard Strecker
*Attorney, Agent, or Firm*—Pillsbury Madison & Sutro LLP

[57] ABSTRACT

An angle detecting apparatus having a simple structure can reliably detect the rotational angle of an object. The apparatus has a rotary shaft, a first conductor arranged in an open loop around the rotary shaft, a second conductor positioned very close to the first conductor and arranged so as to rotate relative to the first conductor, and an angle sensing circuit. The angle sensing circuit generates an original pulse P1, which is input to one end of the first conductor and propagates through it. A portion of the pulse is reflected by the second conductor, and received by the angle sensor as a first reflected pulse P2. The angle sensing circuit determines the angular position of the second conductor based on the time required to receive the first reflected pulse P2. The angle sensor also receives a second reflected pulse P3 which was reflected by the other end of the first conductor. As an alternative, the angle sensing circuit can determines the angular position of the second conductor based on a timing relationship between the first (P1) and second (P2) reflected pulses.

20 Claims, 8 Drawing Sheets

APPARATUS FOR DETECTING A ROTATIONAL ANGLE BASED ON PULSE PROPAGATION

BACKGROUND OF THE INVENTION

1. Field of Invention

This invention relates to an angle detecting apparatus for detecting the rotational angle of an axis using a short pulse signal.

2. Description of the Related Art

A conventional angle detecting apparatus, such as a rotary encoder, provides a dial or a precisely graded scale onto a disc. The dial is then optically or electro-magnetically read to detect the angular position of the disc.

The dial must be graduated precisely to ensure accurate angle detection. High precision sensors are required for reading the minute markings on the dial. Such sensors are generally expensive because of their complicated structures and their precision is easily affected by the environment or shocks. An inexpensive and reliable angle detecting apparatus having a simple structure has been desired in many fields.

SUMMARY OF THE INVENTION

Accordingly, it is an object of the invention to provide a angle detecting apparatus which can overcome the problems in the prior art.

It is another object of the invention to provide an inexpensive angle detecting apparatus which has a simple structure, while it allows highly precise angle detection.

To achieve these objects, the present invention provides a new arrangement for an angle detecting apparatus. In one aspect, an angle detecting apparatus according to the invention has a rotary shaft, a first conductor arranged into an open loop around the rotary shaft, a second conductor positioned very close to the first conductor and arranged so as to rotate relative to the first conductor, and an angle sensor. The angle sensor generates a short pulse, which is input to one end of the first conductor and propagates through the first conductor. A portion of the pulse is reflected by the second conductor, and received by the angle sensor as a first reflected pulse. The angle sensor determines the angular position of the second conductor based on the time required to receive the first reflected pulse.

According to another aspect of the invention, there is provided an angle sensor that receives a second reflected pulse which was reflected by the other end of the first conductor, in addition to the first reflected pulse, and determines the angular position of the second conductor based on time t1 required to receive the first reflected pulse and time t2 required to receive the second reflected pulse.

A short pulse is input to one end of the open-looped first conductor, which propagates through the first conductor. A portion of the pulse is reflected by the second conductor and returns to the angle sensor. The angular position of the second conductor, which rotates together with the rotary shaft along the circular path of the first conductor, is precisely detected based on the pulse reflected by the second conductor. This angle detecting apparatus performs accurate angle detection, while its structure is relatively simple.

BRIEF DESCRIPTION OF THE DRAWINGS

The above and other objects, features and advantages of the present invention will be apparent from the detailed description which follows with reference to the drawings, wherein.

DETAILED DESCRIPTION OF THE PREFERRED EMBODIMENTS

The preferred embodiments of the present invention will now be described with reference to the attached drawings. The embodiments described hereinafter are merely exemplary, and do not limit the invention.

Figure 1:
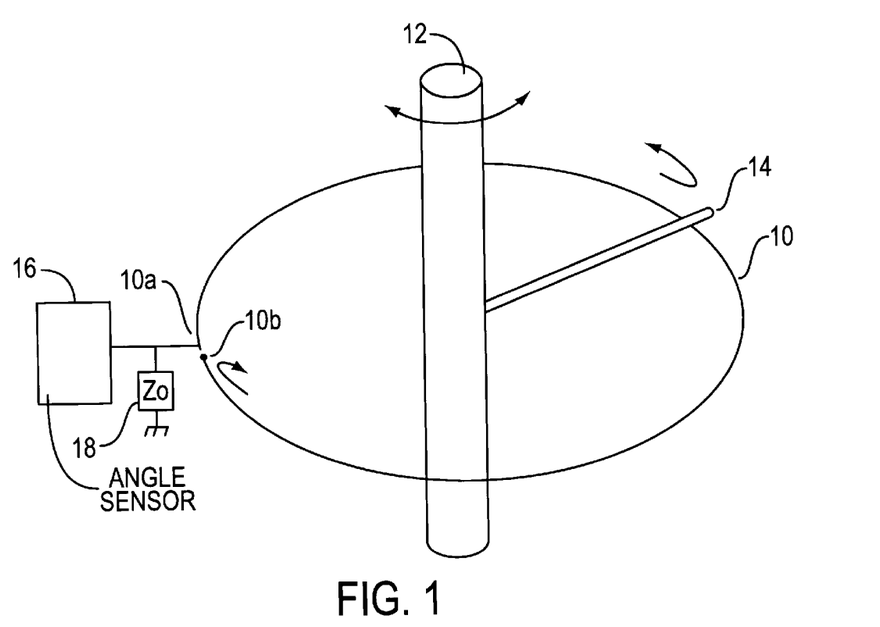
FIG. 1 is a schematic diagram of the angle detecting apparatus according to an embodiment of the invention.

FIG. 1 is schematic diagram of an angle detecting apparatus according to an embodiment of the invention, which shows the basic structure of the angle detecting apparatus. The apparatus comprises a looped conductor 10 which is bent so as to form an open loop or a circular path through which a short pulse signal propagates, and a rotary shaft 12 positioned in the center of the looped conductor 10. A conductive stick 14 extends radially from the rotary shaft 12. The conductive stick 14 rotates along the circular path of the looped conductor 10 as the rotary shaft 12 rotates. An angle sensor 16 is connected to an end point 10a of the open loop of the conductor 10. The angle sensor 16 generates a short pulse, which is input to the conductor 10, and receives any reflected pulses to detect the position of the conductive stick 14. An end resistor 18 having an impedance $Z_0$ is provided to the end point 10a so that the return pulse is not re-reflected by the end point 10a. The other end point 10b is left open so as to allow the pulsed signal, which has propagated through the looped conductor 10, to be reflected by this end point 10b.

The electric potential of the conductive stick 14 is set to a predetermined level. As the rotary shaft 12 rotates, the conductive stick 14 moves along the circular path of the looped conductor 10, while it is in contact with the looped conductor 10 via a dielectric film (not shown), or keeping a position very close to the looped conductor 10.

In this embodiment, the conductive stick 14 rotates together with the rotary shaft 12 with respect to the fixed looped conductor 10. As an alternative, the looped conductor 10 may be rotated together with the rotary shaft 12, while the conductive stick 14 remains fixed. Through the rotation of the conductive stick 14 relative to the looped conductor 10, the angular position of the conductive stick 14 with respect to the looped conductor 10 is detected based on the delay time of the reflected pulse.

Figure 2:
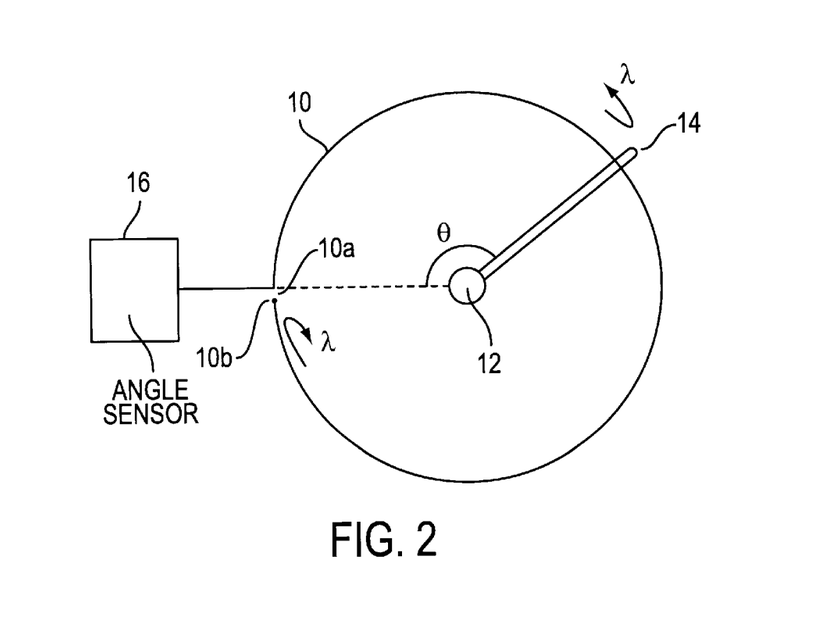
FIG. 2 is a plan view of the angle detecting apparatus shown in FIG. 1.
Figure 3:
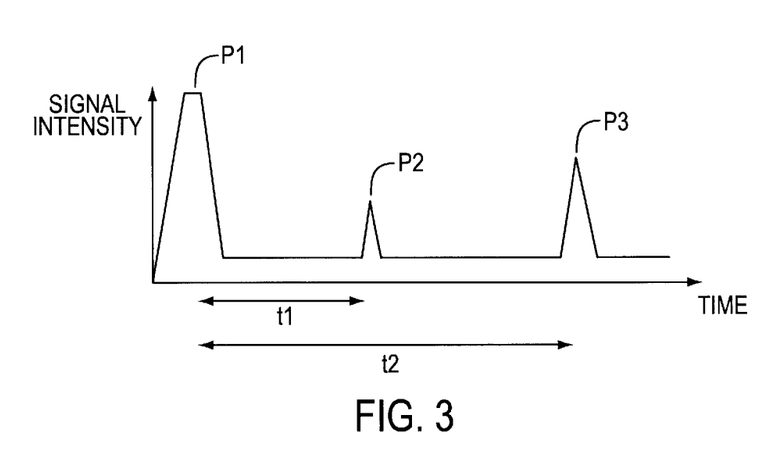
FIG. 3 illustrates the waveform of the pulses which arise as a short pulse signal propagates through the open-looped conductor 10.

FIG. 2 is a plan view of the angle detecting apparatus shown in FIG. 1. FIG. 3 is a graph showing the waveform of the pulses which arise as a short pulse signal propagates through the looped conductor 10. Conductor 10 has an equivalent circuit shown in FIG. 4. The equivalent circuit is a distributed parameter circuit, through which a short pulse signal is easily transmitted. Each section of the equivalent circuit includes a series inductor L1 and a capacitor C1 coupled from one end of L1 to ground. A prescribed capacitance C0, coupled to a source Vo represents the effect of the position where the conductive stick 14 is located. A short pulse, which is indicated by P1 in FIG. 3, is emitted by the angle sensor 16 and input to one end point 10a of the looped conductor 10. A portion of the pulse is reflected by the discontinuity of the impedance due to the capacitance C0 at the position of the conductive stick 14. The reflected pulse, which is indicated by P2 in FIG. 3, returns to the angle sensor 16. Another portion of the pulse which passed through the position of the conductive stick 14 is reflected by the other end 10b of the looped conductor 10. The reflected pulse, which is indicated as pulse P3 in FIG. 3, returns to the angle sensor 16.

Thus, the angle sensor 16 detects three pulses P1, P2 and P3. The angle sensor determines the angle θ (See FIG. 2) made by the conductive stick 14 based on the delay time t1 between pulses P1 and P2 and the propagation speed of the short pulse through the looped conductor 10.

The angle θ may be determined based on the ratio between t1, which is the time delay between P1 and P2, and t2, which is the time delay between P1 and P3. Since the time delay t2 corresponds to 360° in the example shown in FIG. 2, θ is expressed as $$\theta = 360°(t1/t2)$$

Figure 5:
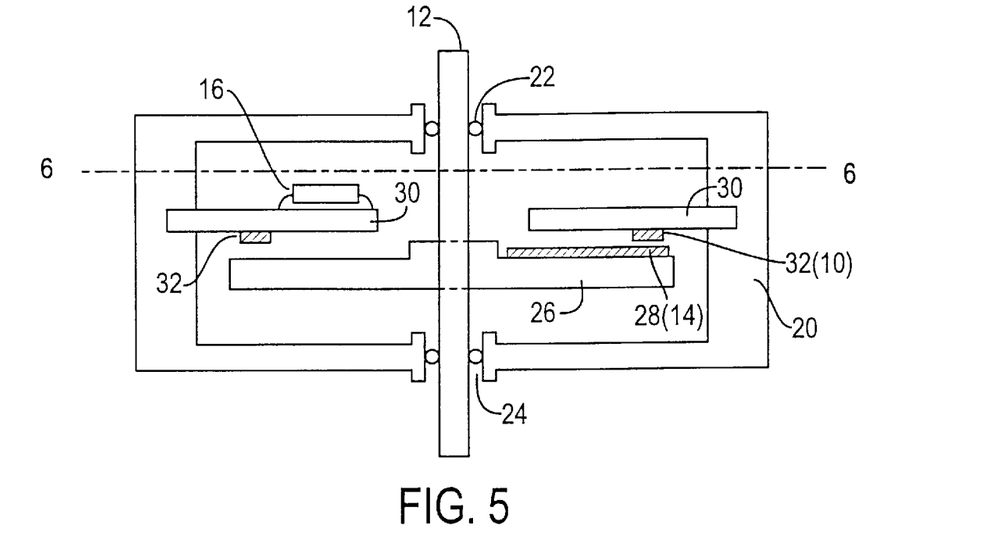
FIG. 5 is a vertical cross-sectional view showing the detailed structure of the angle detecting apparatus shown in FIG. 1.
Figure 6:
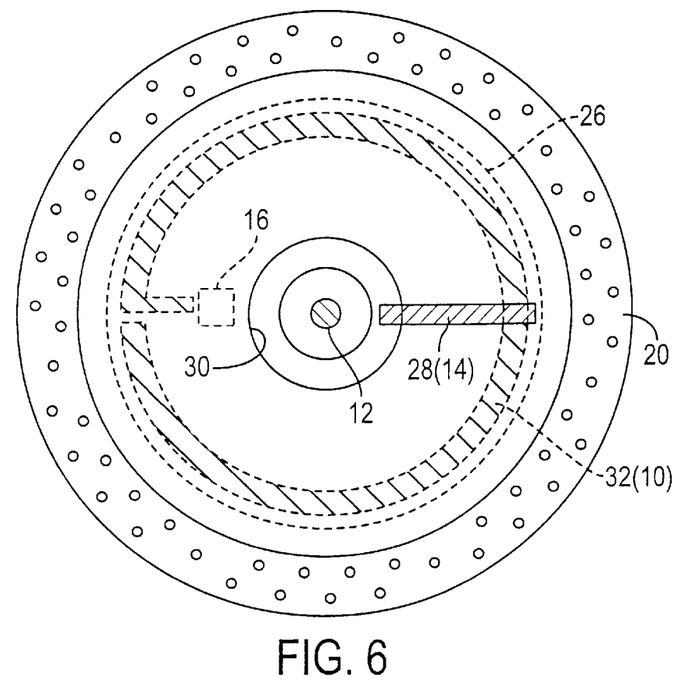
FIG. 6 is a horizontal cross-sectional view of the angle detecting apparatus taken along the X—X line in FIG. 5.

FIG. 5 is a vertical cross-sectional view of the actual structure of the angle detecting apparatus shown schematically in FIG. 1. FIG. 6 is a horizontal cross-sectional view taken along the 6—6 line in FIG. 5. As shown in FIG. 5, the rotary shaft 12 is attached to a case 20 via the bearings 22 and 24 in a rotatable manner. A disc type printed circuit board 26, on which a conductive belt (conductive pattern) 28 is formed, is fixed to the rotary shaft 12. The conductive belt 28 corresponds to the conductive stick 14 shown in FIGS. 1 and 2, and is preferably connected to ground.

Figure 4:
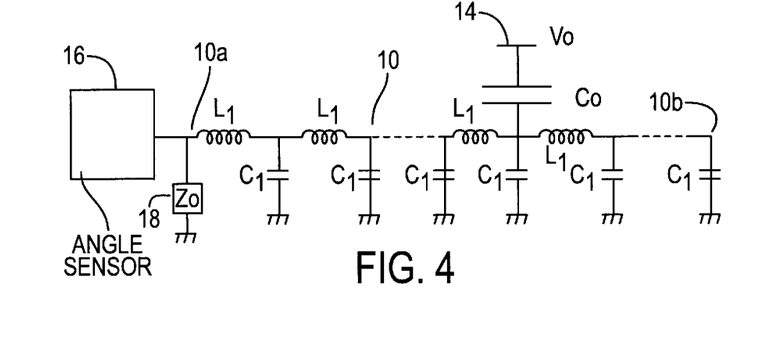
FIG. 4 illustrates an equivalent circuit of the open-looped conductor 10.

A doughnut shaped printed circuit board 30, on which a circular conductive pattern 32 is formed, is fixed to the case 20 so that the circular conductive pattern 32 faces the disc type print board 26 and the conductive belt 28. The circular conductive pattern 32 corresponds to the looped conductor 10. A ground layer is formed inside the doughnut print board 30 so that a desirable pulse-propagation path is constructed along the circular conductive pattern 32. For example, the circuit shown in FIG. 4 is formed as the propagation path along the conductive pattern 32. An angle sensor 16, which is designed as an integrated circuit, is mounted on the other surface of the doughnut print board 30. This angle sensor 16 generates a pulse, and detects any reflected pulses.

Since the disc type print board 26 is fixed to the rotary shaft 12, the conductive belt 28 (which serves as the conductive stick 14) formed on the print board 26 rotates as the rotary shaft 12 rotates. The conductive belt 28 faces the circular conductive pattern 32 with a thin air layer between them, whereby capacitance C0 is formed between conductive belt 28 and pattern 32. If the conductive belt 28 and pattern 32 are coated with dielectric films, they may contact with each other via an appropriate lubricant.

In actual use of the angle detecting apparatus shown in FIG. 5, either the rotary shaft 12 or the case 20 is fixed to an object to be measured. When the object rotates, the rotational angle of the rotary shaft 12 relative to the case 20 changes.

Figure 7:
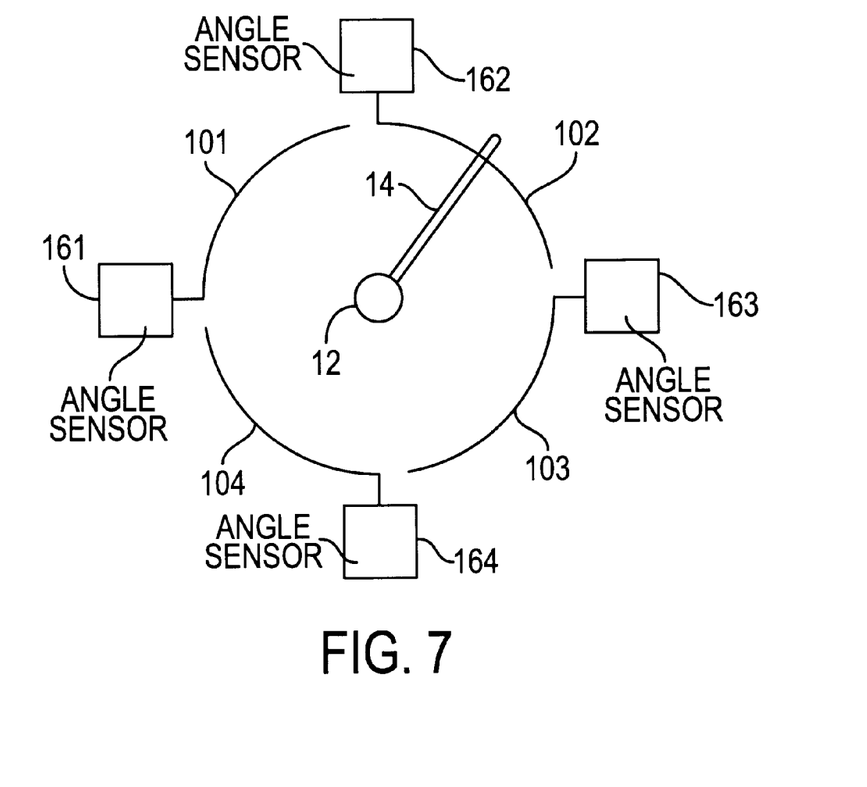
FIG. 7 is a schematic diagram of an angle detecting apparatus according to another embodiment of the invention.

FIG. 7 is a schematic diagram of an angle detecting apparatus according to another embodiment of the invention. In this embodiment, the open-looped conductor is divided into four conductive regions 101, 102, 103 and 104. Four angle sensors 161–164 are provided so that each of them corresponds to one of the conductive regions 101–104. One end of each region is connected to the corresponding angle sensor, and the other end is open. The conductive stick 14, which is fixed to the rotary shaft 12, rotates along the four conductive regions 101–104 as the rotary shaft 12 rotates. Each angle sensor detects the angular position of the conductive stick 14 in its 90° region. Because the angular region monitored by each of the angle sensors is narrowed (less than 360°, the detection error in each region is reduced, and the accuracy of the detected angle is improved.

Figure 8:
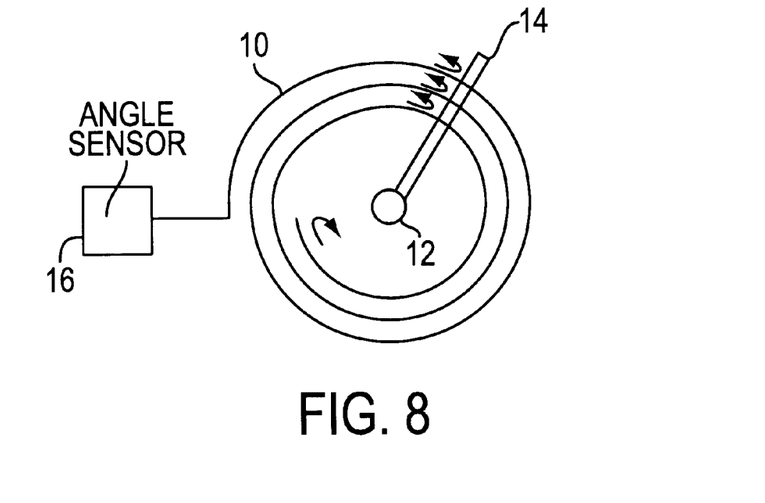
FIG. 8 is a schematic diagram of an angle detecting apparatus according to still another embodiment of the invention.

FIG. 8 illustrates an angle detecting apparatus according to yet another embodiment of the invention. In this embodiment, the conductor 10 is arranged into a coil having three turns. Three coils are shown for convenience. However, the concept of this embodiment applies to any number of coils that is convenient to use in a particular application. The conductive stick 14 intercepts the coiled conductor 10 at three points and, accordingly, the short pulse is reflected by these three points. The angle sensor 16 receives three reflected pulses and determines the angle of the conductive stick 14 from each of the reflected pulses. These three values are averaged to provide a final angular position of the conductive stick 14. This method can improve the accuracy of the detected angle, while reducing the detection error.

Figure 9:
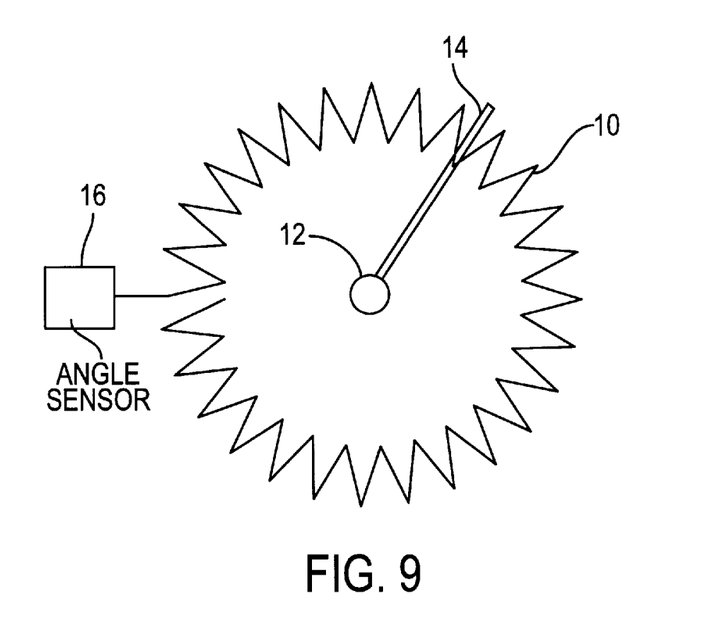
FIG. 9 illustrates another example of the angle detecting apparatus.

FIG. 9 illustrates another example of the angle detecting apparatus. This example is suitable for an application in which the angle of the conductive stick 14 is determined based on two reflected pulses, one reflected by the conductive stick 14 and the other reflected by the end point of the open-looped conductor 10. In this example, the open-looped conductor 10 is arranged in a saw-tooth pattern around the rotary shaft 12 so as to elongate the total length of the pulse propagation path. A portion of the short pulse emitted by the angle sensor 16 is reflected by the conductive stick 14 and returns to the angle sensor 16 after time t1. Another portion of the short pulse is reflected by the end point of the saw-tooth conductor 10 and returns to the angle sensor 16 after time t2. Because the pulse propagation path is elongated, there is a longer time between t1 and t2 than there would be if conductor 10 were shorter. This allows for improved resolution and, consequently, improved accuracy of angle detection.

Figure 10:
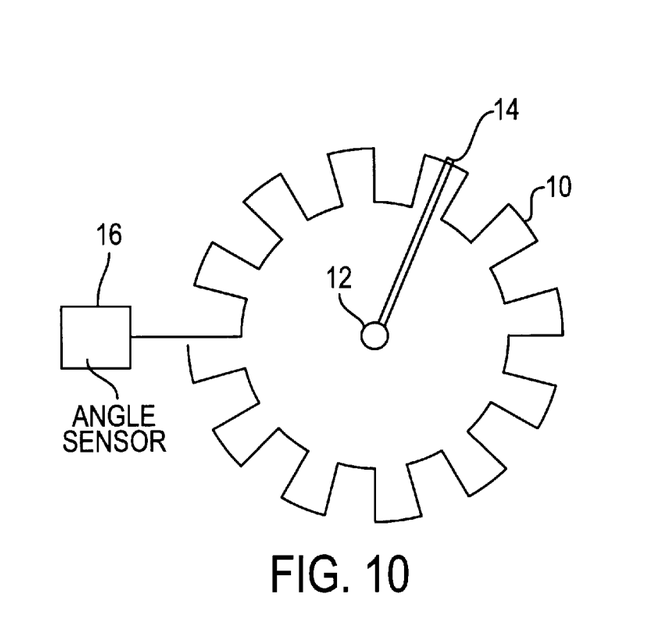
FIG. 10 illustrates still another example of the angle detecting apparatus.
Figure 11:
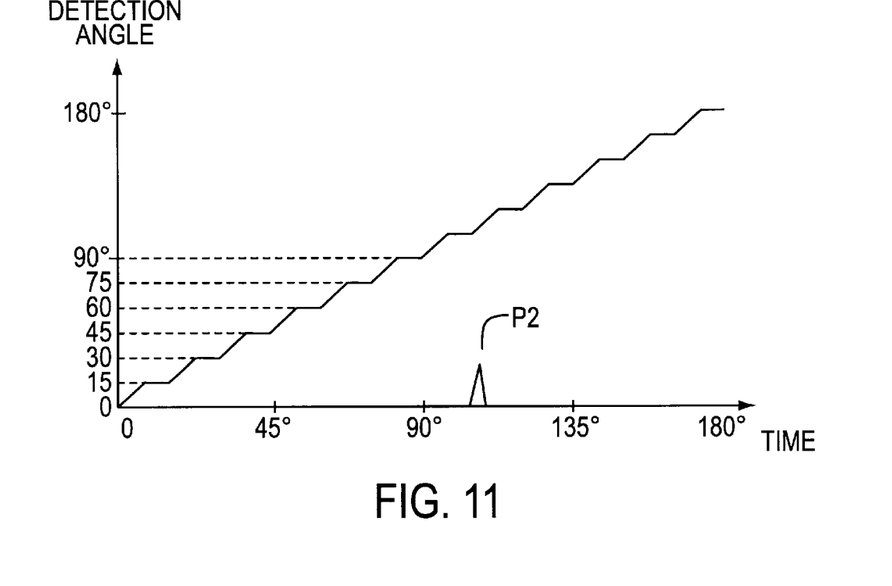
FIG. 11 is a graph of the detected angle as a function of the propagation time of the pulse in the angle detecting apparatus shown in FIG. 10.

FIG. 10 illustrates still another embodiment of the angle detecting apparatus. The open-looped conductor 10 is arranged into a gear-tooth path around the rotary shaft 12. FIG. 11 shows how the rotational angle of the conductive stick 14 is detected in this angle detecting apparatus. In FIG. 11, the horizontal axis represents time required to receive the reflected pulse, and the vertical axis represents rotational angle. In the radial direction of this gear-tooth conductive path, the pulse propagates as time passes, while the detected angle is constant. Because the propagation time of the pulse is increased, the time resolution of reflected pulses is improved. On the other hand, in the tangential direction of the gear-tooth path, the detected angle continuously changes as time elapses. Since, in this example, twelve gear teeth are formed along the open-looped path, the pulse propagates in the radial direction every 15 degrees without any changes in the rotational angle. Thus, the angle detection is performed in a digital manner.

Figure 12:
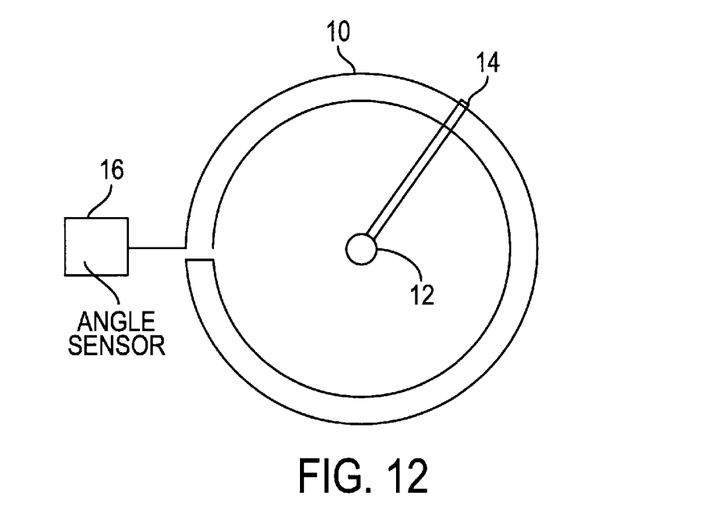
FIG. 12 illustrates still another example of the angle detecting apparatus.

FIG. 12 illustrates still another example of the angle detecting apparatus. The apparatus shown in FIG. 12 is similar to that in FIG. 8; however, the open-looped conductor 10 is folded back so as to form double circles. In this example, the short pulse is reflected by the conductive stick 14 at two points, and the angle sensor 16 determines the angular position of the conductive stick 14 by averaging the two values obtained from the two reflected pulses, whereby the accuracy in the detected angle is improved.

Figure 13:
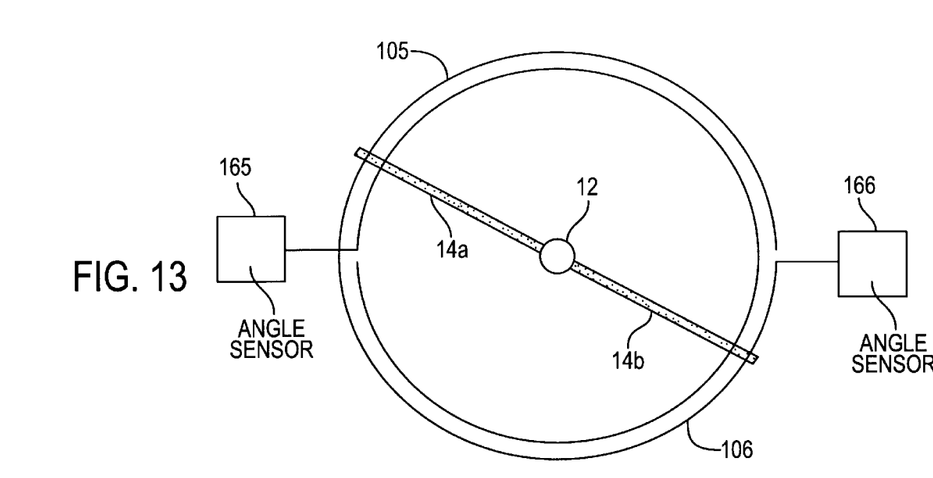
FIG. 13 illustrates still another example of the angle detecting apparatus.

FIG. 13 illustrates still another example of angle detecting apparatus. In this example, the rotational angle of the rotary shaft 12 can be accurately detected even if the rotary shaft is offset from the center of the open-looped conductor 10. This angle detecting apparatus uses a known off-axis compensation method which is generally used in rotary encoders. Namely, a pair of conductive sticks 14a and 14b which extend from the rotary shaft 12 in 180° opposite directions are provided, rather than a single conductive stick 14. In this case, two open-looped conductors 105 and 106 are used in order to facilitate the angle detection, each of which is associated with one of the angle sensors 165 and 166. The angle sensors 165 and 166 generate short pulses at the same time, and each of them detects propagation time t1 and t2 of the reflected pulse.

Figure 14:
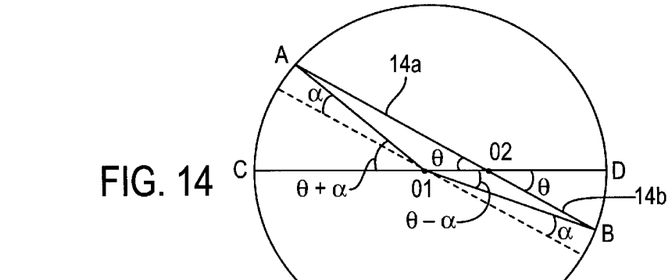
FIG. 14 illustrates how the rotational angle is detected when the rotary shaft is offset from the center of the looped conductor.
Figure 15:
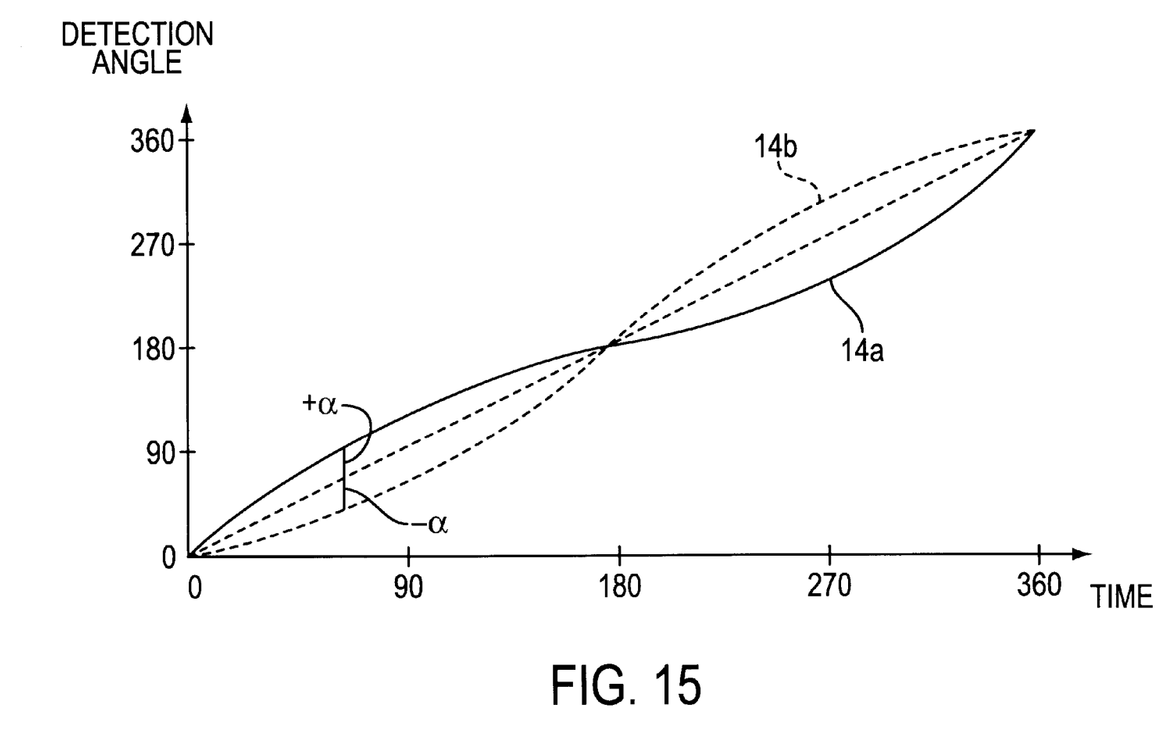
FIG. 15 is a graph of the detected angle as a function of the propagation time of the pulse in the angle detecting apparatus shown in FIG. 13.

FIG. 14 shows how the correct rotational angle is determined when the rotary shaft 12 is offset from the center of the open-looped conductor. If the rotary shaft is offset from the center O1 of the open-looped conductor to point O2, the two conductive sticks 14a and 14b are positioned along the lines AO2 and BO2, respectively. In this case, the correct angle is θ. However, the angle sensor 165 determines the rotational angle of the conductive stick 14a as θ+α based on the pulse reflected by point A, while the angle sensor 166 determines the rotational angle of the conductive stick 14b as θ−α based on the pulse reflected by point B. The relations between the propagation time of the pulse (in the horizontal axis) and the detected angle (in the vertical axis) for the conductive sticks 14a and 14b are shown in FIG. 15. In FIG. 15, the sine curve depicted by the solid line indicates the detected rotational angle of the conductive stick 14a, while the sine curve depicted by the dashed line indicates the detected rotational angle of the conductive stick 14b. Both sine curves contain detection error α, but are 180° out of phase. Accordingly, the error α can be canceled out by adding the angle θ+α, which is detected by the pulse reflected by the conductive stick 14a, and the angle θ−α, which is detected by the pulse reflected by the conductive stick 14b, and dividing by two.

If a single looped conductor 10 is used in combination with a pair of conductive sticks 14a and 14b in the example shown in FIG. 13, then 180° is subtracted from one of the angles detected from the pulses reflected by the conductive sticks 14a and 14b. Then the two angles are added and divided by two in the same manner in order to cancel the error α.

Two more conductive sticks may be added to the example of FIG. 13 so that total four conductive sticks extend from the rotary shaft 12 in every 90-degree direction.

As has been described above, the rotational angle of the rotary shaft is reliably detected, while the structure of the angle detecting apparatus is simplified as compared with the conventional apparatus. Since the manufacture cost can be reduced, an inexpensive and reliable angle detecting apparatus can be achieved.

The short pulse generated by the angle sensor requires only a small amount of electric power and, accordingly, the total power consumption of the angle sensor is relatively low. Besides, the angle detecting apparatus of the present invention requires electric power only when the rotational angle of an object is actually measured, and its power source can usually be off.

While the specific embodiments of the angle detecting apparatus have been illustrated and described, many changes and modifications will be apparent for those skilled in the art, without departing from the spirit and the scope of the invention.

What is claimed is:

1. An angle detecting apparatus for detecting a rotational angle of a rotation axis, comprising:

a first conductor arranged to form an open-end circular path around the axis, the first conductor having first and second ends;

an angle sensing circuit constructed and arranged to generate an original pulse at the first end of the first conductor so that the original pulse propagates through the first conductor in a first direction in order to travel around the rotation axis; and a second conductor constructed and arranged to rotate relative to the first conductor and positioned close enough to the first conductor so that it causes at least a portion of an original pulse propagating therethrough to reflect and propagate through the first conductor as a first reflected pulse in a second direction opposite to the first direction, the angle sensing circuit including a circuit arrangement that receives the reflected pulse and determines an angular position of the second conductor relative to the axis based on a ratio between a time required for the original pulse to travel from the first end to first end via reflecting by effect of the second conductor and a time required for the original pulse to travel from the first end to first end via the second end.

2. An angle detecting apparatus according to claim 1 wherein an original pulse reflects at least in part from the second end of the first conductor as a second reflected pulse and propagates back through the first conductor in the second direction, the angle sensing circuit including a circuit arrangement that receives the first and second reflected pulses and determines an angular position of the second conductor relative to the axis based at least in part on a timing relationship of the first and second reflected pulses received at the angle sensing circuit.

3. An angle detecting apparatus according to claim 2, wherein the angle sensing circuit determines the angular position of the second conductor based on a ratio of delay times of the first and second reflected pulses with respect to the original pulse.

4. An angle detecting apparatus according to claim 1, further comprising:

a dielectric substance providing a predetermined capacitance between the first and second conductors.

5. An angle detecting apparatus according to claim 2, further comprising:
a dielectric substance providing a predetermined capacitance between the first and second conductors.

6. An angle detecting apparatus according to claim 3, further comprising:
a dielectric substance providing a predetermined capacitance between the first and second conductors.

7. An angle detecting apparatus according to claim 1, further comprising a printed circuit board arranged to rotate with the rotation axis, one of the conductors being formed on the printed circuit board.

8. An angle detecting apparatus according to claim 2, further comprising a printed circuit board arranged to rotate with the rotation axis, one of the conductors being formed on the printed circuit board.

9. An angle detecting apparatus according to claim 3, further comprising a printed circuit board arranged to rotate with the rotation axis, one of the conductors being formed on the printed circuit board.

10. An angle detecting apparatus according to claim 1, wherein the first conductor is arranged into a coil having a plurality of turns.

11. An angle detecting apparatus according to claim 2, wherein the first conductor is arranged into a coil having a plurality of turns.

12. An angle detecting apparatus according to claim 1, wherein the first conductor is arranged so as to form a sawtooth path along a circle around the rotation axis.

13. An angle detecting apparatus according to claim 2, wherein the first conductor is arranged so as to form a sawtooth path along a circle around the rotation axis.

14. An angle detecting apparatus according to claim 1, wherein the first conductor is arranged so as to form a geartooth path along a circle around the rotation axis.

15. An angle detecting apparatus according to claim 2, wherein the first conductor is arranged so as to form a geartooth path along a circle around the rotation axis.

16. An angle detecting apparatus for detecting a rotational angle of a rotation axis, comprising:
plural first conductor segments arranged to form together a circular path around the axis, each first conductor segment having first and second ends;
plural angle sensing circuits, each constructed and arranged to generate an original pulse at a first end a respective corresponding first conductor segment so that an original pulse generated by the angle sensing circuit propagates through its associated first conductor segment in a first direction so as to travel around the rotation axis; and
a second conductor constructed and arranged to rotate relative to the first conductor segments and positioned close enough to the first conductor segments so that it causes a portion of an original pulse propagating therethrough to reflect in a second direction opposite to the first direction, each angle sensing circuit including a circuit arrangement that receives any reflected pulse propagating in its associated first conductor segment and determines an angular position of the second conductor relative to the axis based on a ratio between a time required for the original pulse to travel from the first end to first end via reflecting by effect of the second conductor and a time required for the original pulse to travel from the first end to first end via the second end.

17. An angle detecting apparatus according to claim 1 further comprising:
a dielectric substance providing a predetermined capacitance between the first and second conductors.

18. An angle detecting apparatus according to claim 1, further comprising a printed circuit board supported by and rotating with the rotation axis, one of the conductors being formed on the printed circuit board.

19. An angle detecting apparatus for detecting a rotational angle of a rotation axis, comprising:
a first continuous conductor arranged to form an open-end circular path around the axis, the circular path including at least two loops formed by the conductor doubling back upon itself after 360° rotation about the axis, the first conductor thereby having first and second ends at the same angular position about the axis;
an angle sensing circuit constructed and arranged to generate an original pulse at the first end of the first conductor so that the original pulse propagates through the first conductor in a first direction in order to travel around the rotation axis; and
a second conductor constructed and arranged to rotate relative to the first conductor and positioned close enough to the first conductor so that it causes a portion of the original pulse propagating through the first conductor to reflect in a second direction opposite to the first direction, the angle sensing circuit including a circuit arrangement that receives the reflected pulse and determines an angular position of the second conductor relative to the axis based on ratios between times required for the original pulse to travel from the first end to the first end via reflecting by effect of the second conductor and a time required for the original pulse to travel from the first end to first end via the second end.

20. An angle detecting apparatus for detecting a rotational angle of a rotation axis, comprising:
a first conductor arranged to form an open-end circular path around the axis, the first conductor having first and second ends at a first angular position about the axis;
a second conductor arranged to form an open-end circular path around the axis, the second conductor having first and second ends at a second angular position about the axis different from the first angular position about the axis;
a first angle sensing circuit constructed and arranged to generate an original pulse at the first end of the first conductor so that the original pulse propagates through the first conductor in a first direction in order to travel around the rotation axis;
a second angle sensing circuit constructed and arranged to generate an original pulse at the first end of the second conductor so that the original pulse propagates through the second conductor in a second direction in order to travel around the rotation axis; and
a third conductor constructed and arranged to rotate relative to the first and second conductors and positioned close enough to the first and second conductors so that it causes a portion of any original pulse propagating through the first and second conductors to reflect in a direction opposite to the direction of propagation of the original pulse, the angle sensing circuit including a circuit arrangement that receives reflected pulses and determines an angular position of the third conductor relative to the axis based on a ratio between a time required for the original pulse to travel from the first end to first end via reflecting by effect of the second conductor and a time required for the original pulse to travel from the first end to first end via the second end.

* * * * *